(12) United States Patent
Schlegel

(10) Patent No.: US 10,584,631 B2
(45) Date of Patent: Mar. 10, 2020

(54) VARIABLE TURBINE GEOMETRY

(71) Applicant: Mahle International GmbH, Stuttgart (DE)

(72) Inventor: Fritz Schlegel, Kornwestheim (DE)

(73) Assignee: BOSCH MAHLE TURBO SYSTEMS GMBH & GO. KG (DE)

( * ) Notice: Subject to any disclaimer, the term of this patent is extended or adjusted under 35 U.S.C. 154(b) by 330 days.

(21) Appl. No.: 15/441,912

(22) Filed: Feb. 24, 2017

(65) Prior Publication Data

US 2017/0248072 A1  Aug. 31, 2017

(30) Foreign Application Priority Data

Feb. 26, 2016 (DE) .................... 10 2016 203 025

(51) Int. Cl.
| | |
|---|---|
| *F01D 5/18* | (2006.01) |
| *F01D 5/06* | (2006.01) |
| *F02B 37/24* | (2006.01) |
| *F01D 17/16* | (2006.01) |
| *F01D 9/04* | (2006.01) |

(52) U.S. Cl.
CPC .............. *F02B 37/24* (2013.01); *F01D 9/041* (2013.01); *F01D 9/042* (2013.01); *F01D 17/16* (2013.01); *F01D 17/165* (2013.01); *F05D 2220/40* (2013.01); *F05D 2260/56* (2013.01); *F05D 2300/10* (2013.01); *Y02T 10/144* (2013.01)

(58) Field of Classification Search
CPC .......... F01D 9/041; F01D 9/042; F01D 17/16; F01D 17/165; F02B 37/24; F05D 2220/40; F05D 2260/56; F05D 2300/10; Y02T 10/144

USPC .......................................................... 415/163
See application file for complete search history.

(56) References Cited

U.S. PATENT DOCUMENTS

| | | | |
|---|---|---|---|
| 8,573,930 B2 * | 11/2013 | Woo ...................... | F01D 17/165 415/163 |
| 2002/0119041 A1 | 8/2002 | Jinnai et al. | |
| 2010/0014961 A1 * | 1/2010 | Boning ................. | F01D 17/165 415/160 |

(Continued)

FOREIGN PATENT DOCUMENTS

| | | |
|---|---|---|
| DE | 60217563 T2 | 2/2008 |
| DE | 102008049005 A1 | 4/2010 |
| DE | 102010038185 A1 | 5/2011 |

OTHER PUBLICATIONS

English abstract for DE-102008049005.

*Primary Examiner* — Dominick L Plakkoottam
*Assistant Examiner* — Connor J Tremarche
(74) *Attorney, Agent, or Firm* — Fishman Stewart PLLC

(57) ABSTRACT

A variable turbine geometry may include guide blades mounted rotatably in a blade carrier via one blade bearing pin for each guide blade, a blade lever arranged at an end of the blade bearing pin that faces away from the respective guide blade, and an articulated lever for a simultaneous adjustment of the guide blades via an adjusting ring arranged between two adjacent blade levers. The articulated lever may be provided with a stop contour, and when one of a maximum flow position or a minimum flow position is reached, the stop contour may lie against one of the two adjacent blade levers to define the one of the maximum flow position or the minimum flow position.

13 Claims, 2 Drawing Sheets

(56) References Cited

U.S. PATENT DOCUMENTS

2010/0310359 A1* 12/2010 Valin .................... F01D 17/165
    415/160
2012/0328416 A1* 12/2012 Igarashi ................ F01D 17/105
    415/159
2015/0292350 A1   10/2015 Metz

* cited by examiner

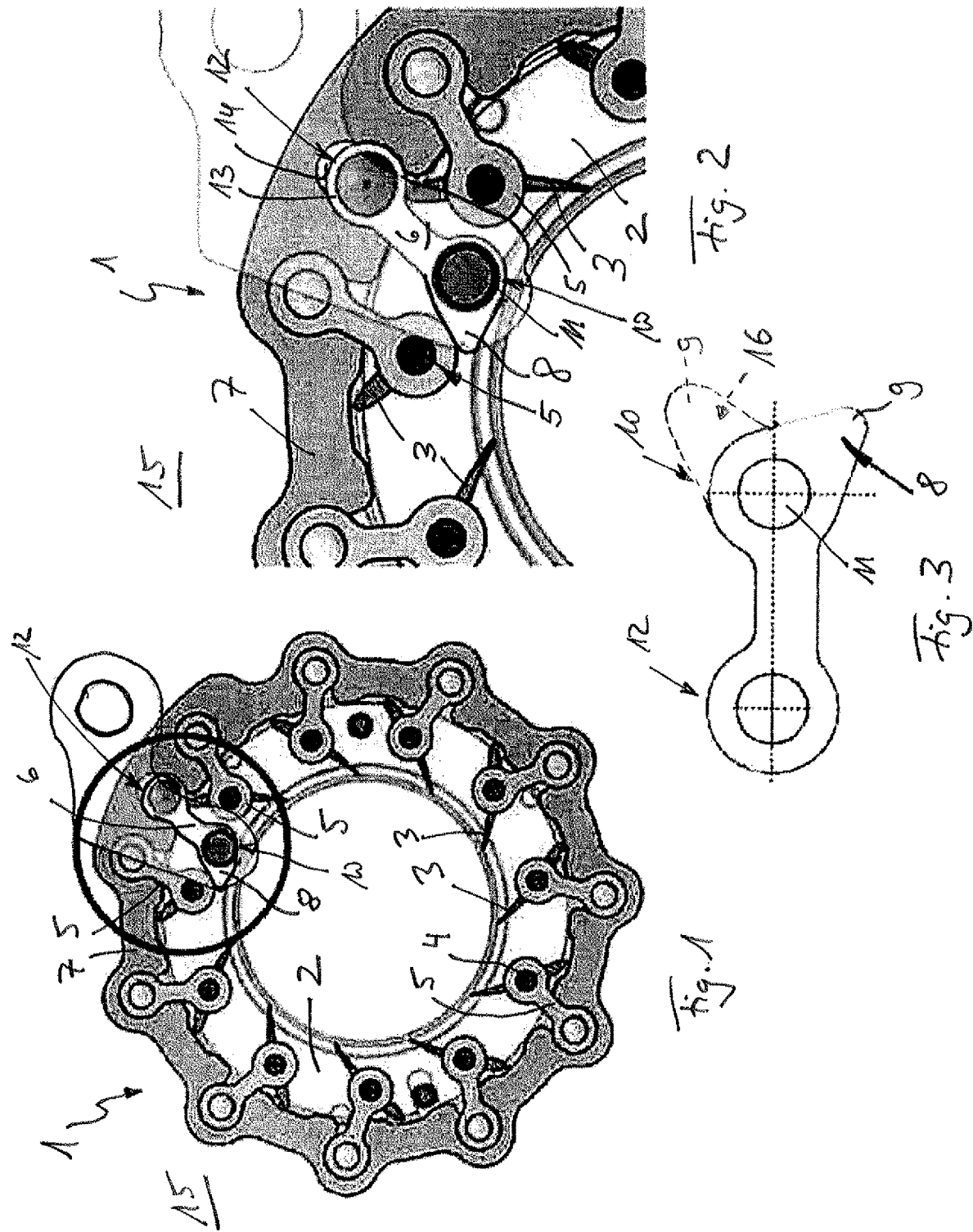

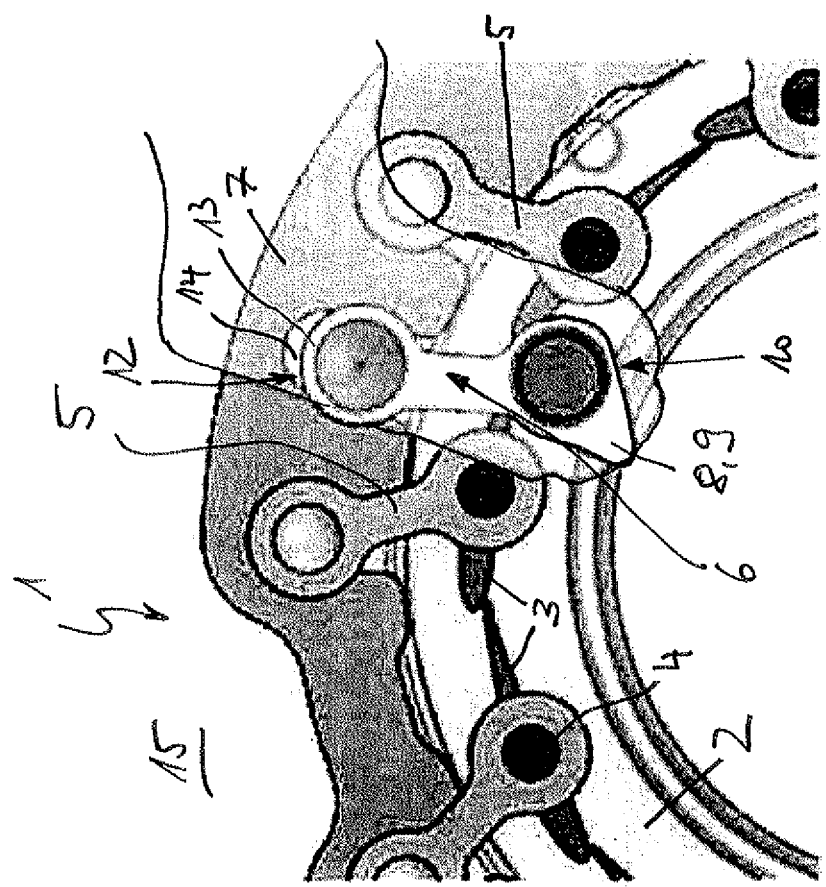
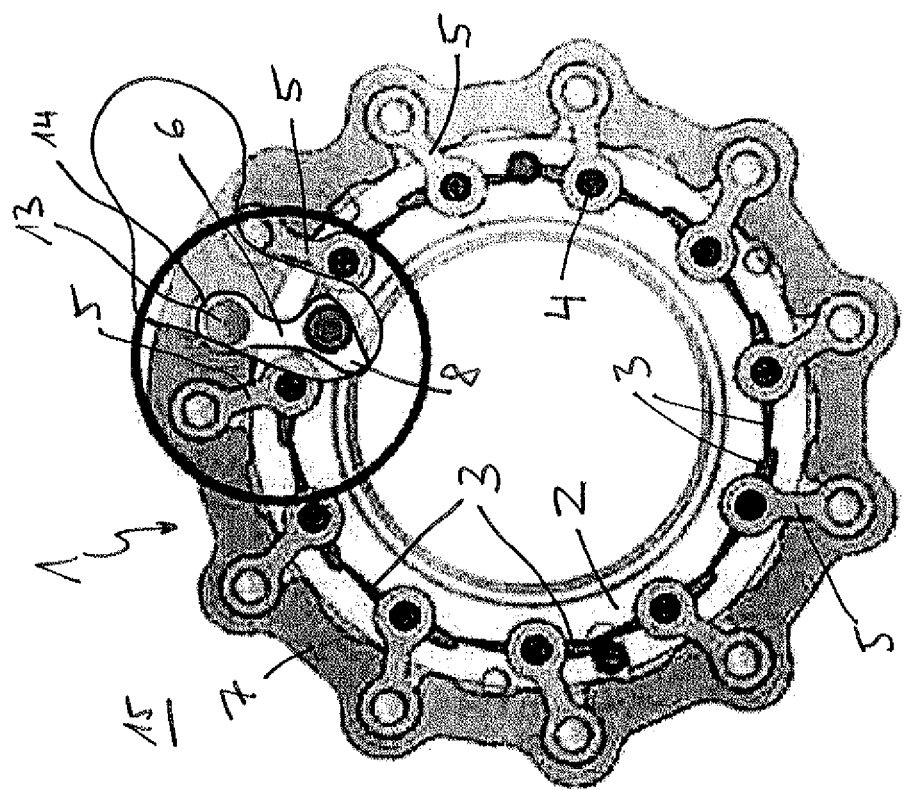

VARIABLE TURBINE GEOMETRY

CROSS-REFERENCE TO RELATED APPLICATIONS

This application claims priority to German Patent Application No. DE 10 2016 203 025.6, filed on Feb. 26, 2016, the contents of which are hereby incorporated by reference.

TECHNICAL FIELD

The present invention relates to a variable turbine geometry with guide blades which are mounted rotatably in a blade carrier via one blade bearing pin each. The invention also relates to an exhaust gas turbocharger with such a variable turbine geometry.

BACKGROUND

DE 10 2008 049 005 A1 discloses a variable turbine geometry of the type in question with guide blades which are mounted rotatably in a blade carrier, wherein an adjusting ring is provided for adjusting the guide blades. Said adjusting ring is provided here with at least one contour which engages in at least one recess on the guide-blade-carrier side or bearing-housing side, wherein the contour and the recess interact with each other in such a manner that an adjusting movement of the adjusting ring relative to the blade carrier is limited.

US 2015/0292350 A1 discloses a further variable turbine geometry in which a certain position of the guide blades is likewise fixed via a corresponding stop geometry.

In general, what is referred to as a "maximum flow position" has to be defined in exhaust gas turbochargers, for example by means of a stop, in order in the most unfavourable case to prevent the guide blades of a variable turbine geometry from opening to such an extent that said guide blades pass into a turbine wheel and can thereby lead to failure of the exhaust gas turbocharger. This is customarily realized via a stop, formed by means of a pin or a grooved drive stud, in the bearing housing or in the blade carrier of the exhaust gas turbocharger, said stop blocking an articulated lever of the variable turbine geometry in its movement when the maximum flow position is reached and, via the adjusting ring, preventing the guide blades from being opened to such an extent that they can enter the turbine wheel.

However, disadvantages with the variable turbine geometries which are known from the prior art and have pins of this type are the resulting comparatively long tolerance chain with different manufacturing tolerances and the angular inaccuracy resulting therefrom in turn at the guide blades. In addition, the pin or, in general, the stop has to be placed in a separate component, for example in the blade carrier, thus resulting in further processing steps and therefore in a higher outlay on production and costs.

The present invention is therefore concerned with the problem of specifying, for a variable turbine geometry of the type in question, an improved or at least an alternative embodiment which in particular reduces the length of a tolerance chain and, in addition, can be realized cost-effectively.

This problem is solved according to the invention by the subject matter of the independent claims. Advantageous embodiments are the subject matter of the dependent claims.

SUMMARY

The present invention is based on the general concept of continuing to realize a maximum flow position or a minimum flow position by means of an articulated lever, but not via a pin additionally arranged in the region of the variable turbine geometry, for example in the region of a blade carrier, but rather via a stop contour which is arranged directly on the articulated lever and, when the maximum flow position or the minimum flow position is reached, lies against one of two adjacent blade levers and thereby blocks/limits a further rotation and adjustment of the guide blades.

The variable turbine geometry according to the invention has in a known manner a blade carrier in which individual guide blades are mounted rotatably via one blade bearing pin each. A blade lever is arranged here at an end of the blade bearing pin that faces away from the respective guide blade, wherein the individual blade levers each engage in corresponding recesses of an adjusting ring and can be rotated simultaneously via said adjusting ring. The adjusting ring in turn is adjusted by means of the articulated lever. According to the invention, said articulated lever is now provided with the previously described stop contour which, when the maximum flow position is reached, lies against one of the two adjacent blade levers and thereby defines the maximum flow position and in particular prevents, via the adjusting ring, an undesirable further rotation of the individual guide blades, which could in the most unfavourable case lead to contact between the guide blades and the turbine wheel. Alternatively, it can also be provided that the articulated lever is provided with a stop contour which, when a minimum flow position is reached, lies against one of the two adjacent blade levers and thereby defines the minimum flow position. The stop contour proposed according to the invention on the articulated lever can be produced here together with the articulated lever and thus does not require any further additional machining/production steps. In addition, a discussion regarding the construction space for the placing of a separate pin can also be omitted, as can its complicated production and arrangement, and therefore advantages in terms of costs can likewise be realized. A further great advantage of the articulated lever according to the invention additionally arises through the direct arrangement of the stop contour on the articulated lever, as a result of which the tolerance chain can be significantly shortened and therefore the angular tolerances for the guide blades can be significantly reduced. By this means, the maximum flow position or the minimum flow position can be particularly exactly defined, limited and maintained.

In an advantageous development of the solution according to the invention, the stop contour is formed integrally with the articulated lever. It is conceivable here in particular for the articulated lever to be designed, for example, as a sheet-metal punched part or in general as an integral metal part, wherein the additional provision of the stop contour according to the invention means only a marginal additional outlay. The stop contour can be designed here in particular as a lug which is freely rotatable depending on the position of the articulated lever and, only when the maximum flow position or the minimum flow position is reached, lies against one of the two adjacent blade levers and thereby fixes and limits the maximum rotation of the guide blades.

In an advantageous development of the solution according to the invention, the articulated lever is mounted at a first end rotatably in the blade carrier, for example in a blade bearing ring, via a bearing pin and engages at a second end with a head in a recess of the adjusting ring, wherein the stop contour in this case is arranged at the first end of the articulated lever. Purely theoretically, the stop contour may, of course, also be arranged at the second end or between the two ends. All that is important here is that, when the maximum flow position or the minimum flow position of the guide blades is reached, said stop contour lies directly against one of the two adjacent blade levers, and therefore no further stop contours, for example pins, have to be provided.

The present invention is furthermore based on the general concept of equipping an exhaust gas turbocharger with a variable turbine geometry of this type and of thereby obtaining a reliable, cost-effective and structurally extremely simple limiting of a maximum flow position or of the minimum flow position. By means of the articulated lever according to the invention, an exhaust gas turbocharger with an extremely short tolerance chain and thus reduced angular tolerance for the individual guide blades can be provided here, said exhaust gas turbocharger at the same time being simple to produce and to install.

Further important features and advantages of the invention emerge from the dependent claims, from the drawings and from the associated description of the figures with reference to the drawings.

It goes without saying that the features mentioned above and those which have yet to be explained below are usable not only in the respectively stated combination, but also in different combinations or on their own without departing from the scope of the present invention.

Preferred exemplary embodiments of the invention are illustrated in the drawings and are explained in more detail in the description below, wherein the same reference signs refer to identical or similar or functionally identical components.

BRIEF DESCRIPTION OF THE DRAWINGS

In the drawings, in each case schematically,
FIG. 1 shows a variable turbine geometry according to the invention in a maximum flow position,
FIG. 2 shows an illustration of a detail from FIG. 1,
FIG. 3 shows an illustration of a detail of an articulated lever according to the invention with a stop contour,
FIG. 4 shows an illustration as in FIG. 1, but in a minimum flow position,
FIG. 5 shows an illustration of a detail from FIG. 4.

DETAILED DESCRIPTION

According to FIGS. 1 and 2 and also 4 and 5, a variable turbine geometry 1 according to the invention has a blade carrier 2, for example a blade bearing ring or a blade cage, in which guide blades 3 are mounted rotatably via one blade bearing pin 4 each. A blade lever 5 is arranged here at an end of the blade bearing pin 4 that faces away from the respective guide blade 3, wherein the blade carrier 2 is illustrated transparently for a better overview according to FIGS. 1 and 2 and also 4 and 5. An articulated lever 6 is likewise provided (cf. also FIG. 3) for the simultaneous adjustment of the guide blades 3 via an adjusting ring 7 which is arranged between two adjacent blade levers 5 (cf. in particular FIGS. 1 and 2 and also 4 and 5). According to the invention, the articulated lever 6 is now provided with a stop contour 8 (cf. in particular also FIG. 3) which, when a maximum flow position is reached (cf. FIGS. 1 and 2), lies against one of the two adjacent blade levers 5 and thereby defines the maximum flow position and in particular prevents further rotation of the individual guide blades 3. Alternatively thereto, it can also be provided that the articulated lever 6 is provided with a stop contour 16 (cf. FIG. 3) which, when a minimum flow position is reached, lies against one of the two adjacent blade levers 5 and thereby defines the minimum flow position.

The stop contour 8, 16 can be formed integrally here with the articulated lever 6, and therefore it is conceivable to produce the articulated lever 6 in the simplest case as a simple sheet-metal punched part. The stop contour 8, 16 can be formed here in particular as a lug 9.

Looking further at FIGS. 1 to 5, it can be seen that the articulated lever 6 is mounted at a first end 10 rotatably in the blade carrier 2 via a bearing pin 11 and engages at a second end 12 with a head 13 in a recess 14 of the adjusting ring 7, wherein the stop contour 8, 16 is arranged in the region of the first end 10 or at the first end 10.

The stop contour 8 provided according to the invention permits in particular the omission of a pin which has been required up to now to limit the maximum flow and which has had to be manufactured separately and installed separately, and therefore the variable turbine geometry 1 according to the invention can be realized significantly more cost-effectively and in a manner which is easier to install, while the alternatively provided stop contour 16 permits a limiting of the minimum flow, to be precise likewise without a separate pin or without the individual guide blades 3 coming into contact here. It is also of particular advantage here that a construction space for such a pin does not have to be provided. With the solution according to the invention, the number of components can therefore be reduced without restricting the function. It is furthermore of decisive advantage that the tolerance chain can be reduced in length and the play of the guide blades 3 in the maximum flow stop can be reduced.

The variable turbine geometry 1 according to the invention can be fitted here into an exhaust gas turbocharger 15. All of the advantages mentioned can also be transferred here in an analogous manner to a variable compressor geometry.

The invention claimed is:
1. A variable turbine geometry comprising:
guide blades mounted rotatably in a blade carrier via one blade bearing pin for each guide blade;
a blade lever arranged at an end of the blade bearing pin that faces away from the respective guide blade; and
an articulated lever for a simultaneous adjustment of the guide blades via an adjusting ring arranged between two adjacent blade levers;
wherein the articulated lever is provided with a stop contour, and when one of a maximum flow position or a minimum flow position is reached, the stop contour lies against one of the two adjacent blade levers to define the one of the maximum flow position or the minimum flow position;
wherein the stop contour projects in a direction oblique to an axis of the articulated lever such that the articulated lever is asymmetrical with respect to the axis; and
wherein the articulated lever is rotatably mounted at a first end in the blade carrier via a bearing pin, and engages at a second end with a head in a recess of the adjusting ring, wherein the stop contour is arranged at the first end.

2. The variable turbine geometry according to claim 1, wherein the stop contour is formed integrally with the articulated lever.

3. The variable turbine geometry according to claim 2, wherein the stop contour is designed as a lug.

4. The variable turbine geometry according to claim 2, wherein the articulated lever is designed as a sheet-metal punched part.

5. The variable turbine geometry according to claim 1, wherein the stop contour is designed as a lug.

6. The variable turbine geometry according to claim 5, wherein the articulated lever is designed as a sheet-metal punched part.

7. The variable turbine geometry according to claim 1, wherein the articulated lever is designed as a sheet-metal punched part.

8. An exhaust gas turbocharger comprising a variable turbine geometry having:
   guide blades mounted rotatably in a blade carrier via one blade bearing pin for each guide blade;
   a blade lever arranged at an end of the blade bearing pin that faces away from the respective guide blade; and
   an articulated lever for a simultaneous adjustment of the guide blades via an adjusting ring arranged between two adjacent blade levers;
   wherein the articulated lever is provided with a stop contour, and when one of a maximum flow position or a minimum flow position is reached, the stop contour lies against one of the two adjacent blade levers to define the one of the maximum flow position or the minimum flow position;
   wherein the stop contour projects in a direction oblique to an axis of the articulated lever such that the articulated lever is asymmetrical with respect to the axis; and
   wherein the articulated lever is rotatably mounted at a first end in the blade carrier via a bearing pin, and engages at a second end with a head in a recess of the adjusting ring, wherein the stop contour is arranged at the first end.

9. The exhaust gas turbocharger according to claim 8, wherein the stop contour is formed integrally with the articulated lever.

10. The exhaust gas turbocharger according to claim 8, wherein the stop contour is designed as a lug.

11. The exhaust gas turbocharger according to claim 8, wherein the articulated lever is designed as a sheet-metal punched part.

12. The exhaust gas turbocharger according to claim 9, wherein the stop contour is designed as a lug.

13. The exhaust gas turbocharger according to claim 9, wherein the articulated lever is designed as a sheet-metal punched part.

* * * * *